United States Patent
Vayanos

(10) Patent No.: US 6,718,174 B2
(45) Date of Patent: Apr. 6, 2004

(54) METHOD AND APPARATUS FOR ESTIMATING VELOCITY OF A TERMINAL IN A WIRELESS COMMUNICATION SYSTEM

(75) Inventor: Alkinoos Vayanos, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 71 days.

(21) Appl. No.: 10/044,194

(22) Filed: Oct. 26, 2001

(65) Prior Publication Data

US 2002/0177450 A1 Nov. 28, 2002

Related U.S. Application Data

(60) Provisional application No. 60/244,109, filed on Oct. 27, 2000.

(51) Int. Cl.[7] ............................ H04Q 7/20; G01S 13/08
(52) U.S. Cl. ................ 455/456.1; 342/104; 342/357.05
(58) Field of Search ......................... 455/456.1–456.6, 455/12.1; 342/104–117, 357.01–357.14, 418

(56) References Cited

U.S. PATENT DOCUMENTS

| | | | | |
|---|---|---|---|---|
| 5,185,610 A | * | 2/1993 | Ward et al. | 342/357.11 |
| 5,420,592 A | | 5/1995 | Johnson | 342/357 |
| 5,646,630 A | * | 7/1997 | Sheynblat et al. | 342/357.14 |
| 5,874,914 A | * | 2/1999 | Krasner | 342/357.12 |
| 6,005,513 A | | 12/1999 | Hardesty | 342/357.09 |
| 6,058,306 A | * | 5/2000 | Liu | 455/427 |
| 6,061,021 A | | 5/2000 | Zibell | 342/418 |
| 6,133,867 A | * | 10/2000 | Eberwine et al. | 342/29 |
| 6,285,316 B1 | * | 9/2001 | Nir et al. | 342/357.09 |
| 6,531,981 B1 | * | 3/2003 | Fuller et al. | 342/357.03 |

FOREIGN PATENT DOCUMENTS

| | | | | |
|---|---|---|---|---|
| EP | 0389972 | 3/1990 | | G01S/11/10 |

* cited by examiner

*Primary Examiner*—Erika Gary
(74) *Attorney, Agent, or Firm*—Philip Wadsworth; Charles Brown; Donald Kordich

(57) ABSTRACT

Techniques to estimate the velocity of a terminal in a wireless communication system. Movement by the terminal results in a Doppler shift in the frequency of each transmitted signal received at the terminal. In one method, the positions of the terminal, a base station, and each of two or more satellites are initially determined. A residual rate of change of pseudo-range may also be determined for each satellite, e.g., based on (1) an estimated baseband frequency error that includes the Doppler frequency shift due to the terminal's movement and (2) an estimated Doppler frequency shift due to movement by the satellite. A set of equations is then formed based on the determined positions of the terminal, the base station, and the satellites and the determined residual rates of change of pseudo-ranges for the satellites. The velocity of the terminal may thereafter be estimated based on the set of equations.

24 Claims, 3 Drawing Sheets

METHOD AND APPARATUS FOR ESTIMATING VELOCITY OF A TERMINAL IN A WIRELESS COMMUNICATION SYSTEM

RELATED APPLICATIONS

This application claims priority to U.S. Provisional Application No. 60/244,109, filed Oct. 27, 2000.

BACKGROUND

1. Field

The present invention relates generally to communication systems, and more particularly to techniques for estimating the velocity of a terminal in a wireless communication system.

2. Background

A common means by which to locate a terminal is to determine the amount of time required for signals transmitted from multiple sources at known locations to reach the terminal. One system that provides signals from a plurality of transmitters of known locations is the well-known Global Positioning System (GPS). Satellites in the GPS system are placed in precise orbits according to a GPS master plan. The locations of the GPS satellites can be identified by different sets of information (referred to as the Almanac and Ephemeris) transmitted by the satellites themselves. Another system that provides signals from transmitters (i.e., base stations) at known earth-bound locations is a wireless (cellular) communication system.

Signals from satellites and/or base stations may be used to estimate the location of a terminal. By receiving and processing the signals transmitted from these transmitters, the amount of time required for the signals to travel from the transmitters to the terminal may be estimated and used to compute the distances (or ranges) between the transmitters and the terminal. The signals themselves may further include information indicative of the locations of the transmitters. By accurately determining the distances to three or more transmitters at known locations, the position of the terminal may be determined using trilateration.

In certain instances and for certain applications, the velocity of the terminal may also need to be ascertained. In one simple technique for estimating velocity, a series of position fixes are determined for the terminal and used to estimate its velocity. However, this technique has several shortcomings. One shortcoming relates to the use of position fixes to estimate velocity. If the position fixes are determined at short time intervals, then small errors in the position fixes may result in large errors in the velocity estimate. However, if the position fixes are determined at longer time intervals, then the position fixes may be more indicative of the average velocity of the terminal instead of the instantaneous velocity.

A second shortcoming is related to the shared resources at the terminal. In many terminal designs, some or all of the elements used for voice and/or data communication are also used for position determination These terminal designs typically do not allow the shared elements to be used simultaneously for both communication and position determination. Consequently, communication is typically inhibited while position is being determined, and vice versa Obtaining several consecutive position fixes would then require the terminal to stay in a GPS mode for an extended period of time or to repeatedly interrupt communication.

There is therefore a need in the art for techniques to efficiently and accurately estimate the velocity of a terminal in a wireless communication system.

SUMMARY

Aspects of the invention provide techniques to estimate the velocity of a terminal in a wireless communication system. Movement by the terminal results in a Doppler shift in the frequency of each transmitted signal received at the terminal. This Doppler frequency shift is related to the terminal's velocity, which may be accurately estimated by processing the received signal to provide a set of frequency errors in the transmitted signals (as received at the terminal) for a number of satellites. Various scenarios are described in further detail below, and the terminal's velocity may be estimated (1) based on signals from both base station and satellites or based only on signals from satellites and (2) for a 3-dimensional (e.g., earth-centered, earth-fixed) or a 2-dimensional (e.g., east, north) frame.

A specific embodiment of the invention provides a method for estimating the velocity of a terminal in a wireless communication system. In accordance with the method, the positions of the terminal a base station, and each of two or more satellites are initially determined. A residual rate of change of pseudo-range may also be determined for each satellite. A set of equations is then formed based on the determined positions of the terminal, the base station, and the satellites and the determined residual rates of change of pseudo-ranges for the satellites. The velocity of the terminal may thereafter be estimated based on the set of equations.

To determine the residual rates of change of pseudo-ranges for the satellites, the received signal (which includes the signals transmitted from the satellites) is initially down-converted to provide a baseband signal. The frequency error of the baseband signal is then determined for each satellite. The Doppler shift in the frequency of the signal from each satellite is also estimated. The residual rate of change of pseudo-range for each satellite is then determined based on the estimated baseband frequency error and Doppler frequency shift for the satellite.

For certain scenarios, the terminal's velocity may be estimated without using the base station. In this case, the residual rates of change of pseudo-ranges are determined for three or more satellites, and the frequency error in the oscillator used to downconvert the received signal becomes an additional unknown that can be solved for using an additional satellite measurement. The velocity estimation techniques are described in further detail below.

The invention further provides other methods, computer program products, receiver units, terminals, and apparatus and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
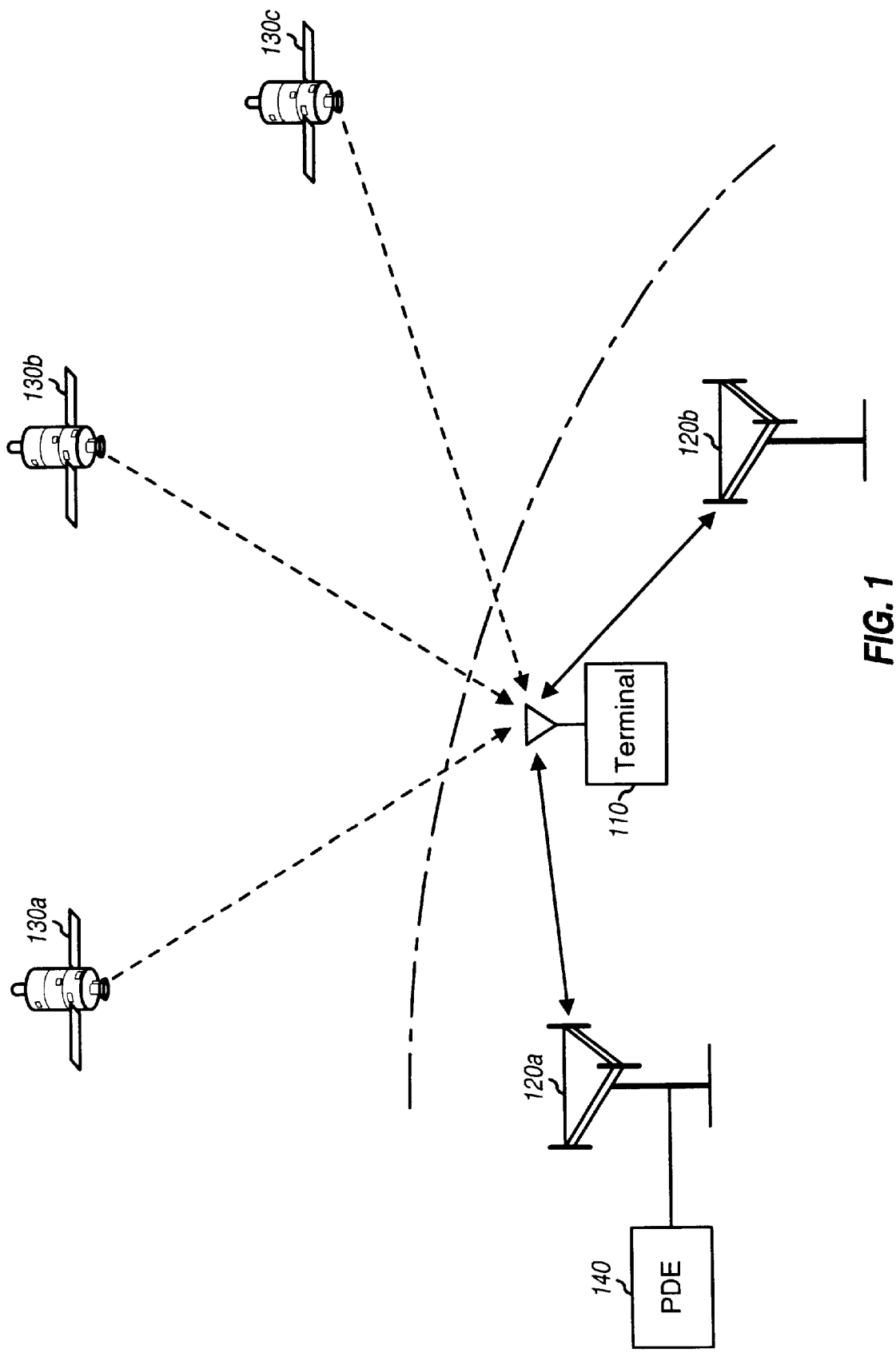
FIG. 1 is a simplified diagram of a system wherein various aspects and embodiments of the invention may be implemented.

FIG. 1 is a simplified diagram of a system wherein various aspects and embodiments of the invention may be implemented. A terminal 110 whose position and velocity are to be ascertained receives signals transmitted from a number of transmitters, which may be base stations 120a and 120b of a wireless communication system and/or satellites 130a, 130b and 130c of the Global Positioning System (GPS). In general, any type of transmitter having locations that are known or can be ascertained may be used to estimate position and velocity.

Terminal 110 may be any device capable of determining the arrival times of transmitted signals with respect to a reference time. In one embodiment, terminal 110 is a cellular telephone capable of receiving signals from a number of transmitters. In other embodiments, terminal 110 may be an electronics unit (e.g., a computer terminal, a personal digital assistance (PDA), and so on) having a wireless modem, a stand-alone GPS receiver, a receiver capable of receiving signals from satellites and/or base stations 120a and 120b, or any other type of receiver.

The position and velocity of terminal 110 may be estimated based on signals received at the terminal (e.g., such as those transmitted from the GPS satellites 130a, 130b and 130c and/or base stations) plus the locations of the transmitters from which the signals originated. The position and velocity of the terminal 110 may be estimated by the terminal 110, a Position Determining Equipment (PDE) 140 in the wireless communication system, a base station, or some other entity. The entity performing the position and velocity estimation is provided with the necessary information (e.g., the pertinent measurements and either the locations of the transmitters or the means to determine these locations).

The locations of the GPS satellites 130a, 130b and 130c may be ascertained by processing the signals transmitted by the satellites. Each satellite transmits "Almanac" information, which includes information regarding coarse locations of all satellites in the constellation. Each satellite further transmits "Ephemeris" information, which includes a higher accuracy version of its own orbit, as tracked and reported by tracking stations on earth. The locations of the base stations 120a and 120b may also be made known (e.g., via messages) to the entity performing the position and velocity estimation for the terminal 110. For example, the terminal 110 may include a database of the locations of the base stations 120a and 120b and/or satellites 130a, 130b and 130c or these locations may be provided by a PDE or base station. Alternatively, the base station or PDE may perform the position and velocity estimation for the terminal and may have the information for the satellite 130a, 130b and 130c and/or base station locations. The location information for the satellites 130a, 130b and 130c and/or base stations 120a and 120b may also be transmitted via messages.

The GPS satellites 130a, 130b and 130c and base stations 120a and 120b may be used as reference points to estimate the location of a terminal. By accurately measuring the distances to three transmitters at known locations, the position of the terminal can be determined using trilateration. The terminal can estimate the distance to each transmitter by measuring the time required for a signal to travel from the transmitter to the terminal. If the time the signal is transmitted from the transmitter is known (e.g., stamped into the signal), then the travel time of the signal can be determined by observing the time the signal is received at the terminal (based on its internal clock). Typically however, the amount of time between transmission and reception cannot be exactly determined because of offsets between the clocks at the transmitter and terminal. Thus, a "pseudo-range" is typically obtained based on the difference between a reference time and the time that the signal is received.

Figure 2:
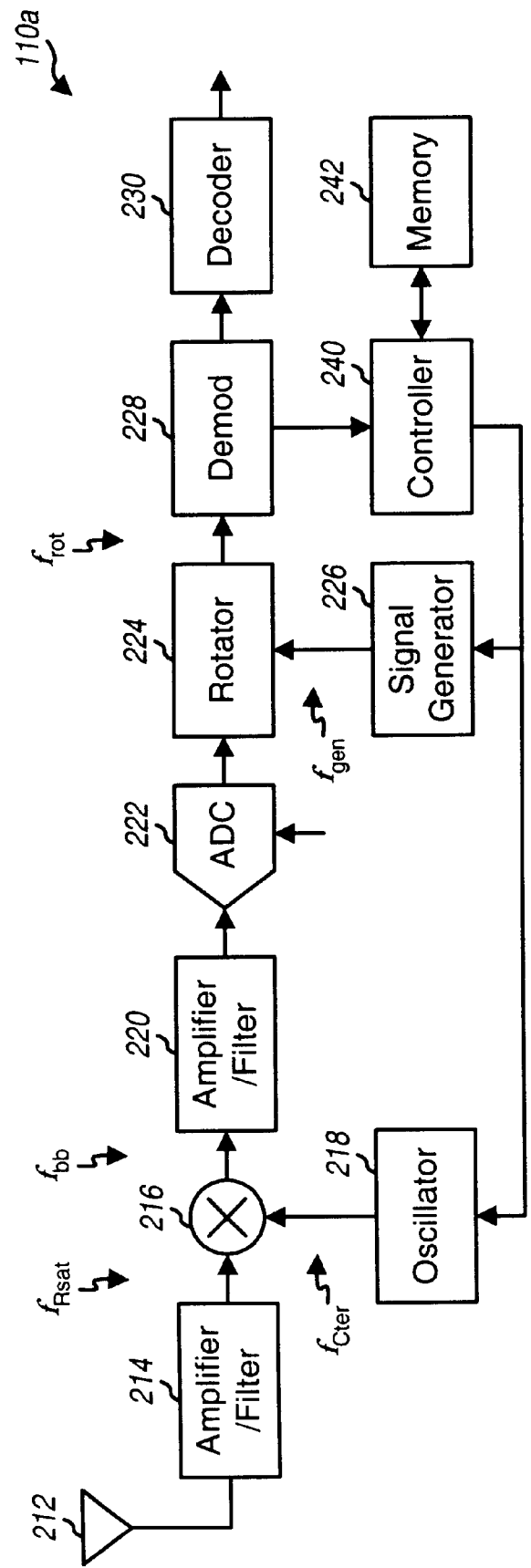
FIG. 2 is a block diagram of an embodiment of some of the processing performed by a terminal to estimate its position and velocity.

FIG. 2 is a block diagram of an embodiment of some of the processing performed by the terminal 110 to estimate its position and velocity. The signals transmitted by the base stations 120a and 120b and/or satellites 130a, 130b and 130c are initially received by an antenna 212 and provided to an amplifier/filter block 214, which conditions (e.g., filters and amplifies) the received signal to provide a conditioned radio frequency (RF) signal. A mixer 216 then downconverts the RF signal to baseband with a local oscillator (LO) signal provided by an oscillator 218. The baseband signal may further be amplified and filtered by an amplifier/filter block 220 and then digitized by an analog-to-digital converter (ADC) 222 to provide (complex) data samples.

In a typical receiver design, there may be one or more stages of amplifier, filter, mixer, and so on. For example, the received signal may first be downconverted to an intermediate frequency (IF) with a first LO signal and thereafter (quadrature) downconverted to baseband with a second LO signal. For simplicity, these various signal conditioning stages are lumped together into the blocks shown in FIG. 2. For example, mixer 216 may represent one or multiple downconversion stages (e.g., from RF down to IF, and from IF down to baseband).

In the embodiment shown in FIG. 2, the data samples are provided to a rotator 224 that translates the center frequency of the data samples with a carrier signal provided by a signal generator 226. Rotator 224 may be implemented as a complex digital multiplier that multiplies the data samples with the carrier signal to provide rotated data samples. A demodulator 228 then receives and further processes the rotated data samples to provide various types of information (e.g., frequency and timing information, as described below) and may further provide demodulated data for a subsequent decoder 230.

A controller 240 receives the frequency and timing information from demodulator 228 and further provides control signals to oscillator 218 and/or signal generator 226. These control signals may be used to set or adjust the frequency of the LO signal provided to mixer 216 and the frequency of the carrier signal provided to rotator 224.

A terminal's velocity may be estimated based on an offset in a transmitted signal's carrier frequency (as received at the terminal) relative to a nominal carrier frequency. Each satellite moves with a velocity vector, $\bar{v}_{Si}$, relative to a frame that is fixed with respect to the earth, and the terminal may also move with a velocity vector, $\bar{v}_T$, relative to this frame. Each satellite transmits a signal with a carrier frequency of $f_{Csat,\ i}$, and this signal is received at the terminal with a frequency of $f_{Rsat,\ i}$. The receive frequencies of the signal may be expressed as:

$$f_{Rsat,\ i} = f_{Csat,\ i} + f_{Vsat,\ i} + f_{Vter,\ i}, \quad \text{Eq (1)}$$

where $f_{Csat,\ i}$ is the frequency of the signal as transmitted from the i-th satellite, $f_{Vsat,\ i}$ is a Doppler shift in the i-th satellite's carrier frequency (as observed at the terminal) due to movement by the satellite ($f_{Vsat,\ i}$ is related to the satellite's velocity), $f_{Vter,\ i}$ is a Doppler shift in the i-th satellite's carrier frequency (as observed at the terminal) due to movement by the terminal ($f_{Vter, i}$ is related to the terminal's velocity), and $f_{Rsat, i}$ is the frequency of the i-th satellite's transmitted signal as received at the terminal.

As shown in FIG. 2, the received signal $f_{Rsat, i}$ is downconverted by mixer 216 with an LO signal having a frequency $f_{Cter}$. The frequency of the signal transmitted, $f_{Cast, i}$ by the i-th satellite may be expressed as being equal to a nominal carrier frequency, $f_{nom}$, plus an offset (or error), $f_{Osat, i}$, relative to the nominal frequency (i.e., $f_{Cast, i}=f_{nom}+f_{Osat, i}$) and the frequency of the terminal's oscillator, $f_{Cter}$, may be expressed as being equal to the nominal carrier frequency, $f_{nom}$, plus an offset, $f_{Oter}$, relative to the nominal frequency (i.e., $f_{Cter}=f_{nom}+f_{Oter}$). In this case, equation (1) may then be expressed as:

$$f_{Rsat, i}=f_{nom}+f_{Osat, i}+f_{Vsat, i}+f_{Vter, i}. \quad \text{Eq (2)}$$

After downconversion by mixer 216, the i-th satellite's baseband signal has a frequency error (from 0 Hz) of $f_{bb, i}$, which may be expressed as:

$$\begin{aligned} f_{bb,i} &= f_{Rsat,i} - f_{Cter} \quad &\text{Eq (3)}\\ &= (f_{nom} + f_{Osat,i} + f_{Vsat,i} + f_{Vter,i}) - (f_{nom} + f_{Oter}).\\ &= f_{Vsat,i} + f_{Vter,i} + f_{Osat,i} - f_{Oter} \end{aligned}$$

As described in further detail below, the velocity of the terminal 110 is related to the Doppler frequency shift, $f_{Vter, i}$, in the received signal due to movement by the terminal 110. To determine the terminal's Doppler frequency shift, $f_{Vter, i}$, the other terms, $f_{Vsat, i}$, $f_{Osat, i}$, and $f_{Oter}$, in equation (3) may either be estimated and removed or accounted for.

In an embodiment, the Doppler frequency shift, $f_{Vsat, i}$, in the received signal due to movement by the satellite is estimated (e.g., by an aiding entity and provided to the terminal or some other entity performing the computations to estimate the terminal's velocity and position). The aiding entity may be a base station having the capability to track the satellites and to estimate the satellite's velocity and Doppler frequency shift.

A satellite's velocity $V_{si}$ relative to a specific reference location on earth (e.g., at the base station's location or the terminal's location) can typically be determined accurately using the satellite's Ephemeris information. The accuracy of this specific reference location only moderately affects the value of the satellite's Doppler frequency shift. For example, an error of one kilometer in the reference location introduces less than one Hertz of error in the satellite's Doppler frequency shift. In this case, the satellite's Doppler frequency shift may be initially estimated at the base station's position If the terminal is located within 10 km of the base station, then the satellite's Doppler frequency shift, as estimated at the base station, would have less than 10 Hz of error at the terminal, which is acceptable for many applications. The satellite's Doppler frequency shift may thereafter be more accurately estimated at the terminal's position (instead of the base station's position) once the terminal's position has been estimated based on any number of position determination techniques known in the art. The Doppler frequency shift may be estimated for each satellite to be used to estimate the terminal's velocity.

The baseband frequency error, $f_{bb, i}$, may be estimated and used to estimate the terminal's velocity in a manner described in further detail below. In an embodiment, the baseband frequency error, $f_{bb, i}$, may be estimated based on a frequency control loop used to acquire and track the frequency of the signal from a transmitter. The received frequency of the signal (as tracked by the frequency control loop) may be subtracted from the signal's nominal carrier frequency to provide the baseband frequency error, $f_{bb, i}$, for the transmitter. One frequency control loop may be used to acquire and track the signal from each transmitter.

In another embodiment, the baseband frequency error, $f_{bb, i}$, is estimated by performing signal processing on the data samples. To satisfy the requirements mandated by the Federal Communications Commission (FCC) for an enhanced emergency 911 (E-911) service, the terminal needs to work in difficult environments (e.g., dense urban areas and indoor) and at low signal-to-noise-plus-interference ratios (SNRs). In order to achieve this, coherent integration of the received signal for longer periods of time is needed to detect the signal in the presence of noise. And to integrate the signal longer without suffering significant losses, it is necessary to better estimate the frequency of a transmitted signal, as received at the terminal, so that the frequency error is as small as possible. The frequency error may be reduced by estimating and removing the satellite's Doppler frequency shift and the carrier frequency offset.

In an embodiment, the satellite carrier frequency offset, $f_{Osat, i}$, is estimated based on the Ephemeris information transmitted by the satellite. The estimated satellite carrier frequency offset, $\hat{f}_{Osat, i}$, may be combined with an initial estimate of the satellite Doppler frequency shift, $\tilde{f}_{Vsat, i}$, and provided to the terminal 110.

The terminal 110 receives (or possibly derives) the initial estimate of the satellite Doppler frequency shift, $\tilde{f}_{Vsat, i}$, (e.g., as determined for the base station's position) and the estimated satellite carrier frequency offset, $\hat{f}_{Osat, i}$, and sets the frequency of the rotator's carrier signal to this frequency (i.e., $f_{gen, i}=\tilde{f}_{Vsat, i}+\hat{f}_{Osat, i}$). After the digital rotation of the data samples with the carrier signal by rotator 224, the rotated data samples have a frequency error (from 0 Hz) of $f_{rot, i}$, which may be expressed as:

$$\begin{aligned} f_{rot,i} &= f_{bb,i} - (\tilde{f}_{Vsat,i} + \hat{f}_{Osat,i}) \quad &\text{Eq (4)}\\ &= f_{Vsat,i} + f_{Vter,i} + f_{Osat,i} - f_{Oter} - \tilde{f}_{Vsat,i} - \hat{f}_{Osat,i},\\ &= \Delta f_{Vsat,i} + f_{Vter,i} + \Delta f_{Osat,i} - f_{Oter} \end{aligned}$$

where $\Delta f_{sat, i}$ is the error in the initial estimate of the i-th satellite's Doppler frequency shift (i.e., $\Delta f_{Vsat, i}=f_{Vsat, i}-\tilde{f}_{Vsat, i}$), and $\Delta f_{Osat, i}$ is the error in the estimate of the i-th satellite's carrier offset (i.e., $\Delta f_{Osat, i}=f_{Osat, i}-\hat{f}_{Osat, i}$).

The frequency error, $f_{rot, i}$, typically falls within a range that may be estimated based on an estimated range of each constituent element in the sum in equation (4). The satellite's Doppler frequency shift, $f_{Vsat, i}$, is typically on the order of ±5 kHz, but the error in the initial estimate of the satellite's Doppler frequency shift, $\Delta f_{Vsat, i}$, is typically in the order of tens of Hertz. The terminal's Doppler frequency shift, $f_{Vter, i}$, lies within ±200 Hertz for reasonable vehicle speed and the error in the estimate of the satellite's carrier frequency offset, $\Delta f_{Osat, i}$, is negligible. The terminal's carrier frequency offset, $f_{Oter}$, is dependent on various factors. However, if the terminal's oscillator is locked to the base station carrier frequency and if the base station in turn has a very accurate frequency base, then this term will have the same range as $f_{Vter, i}$. Therefore, in these circumstances, the frequency error of the rotated data samples, $f_{rot, i}$, will be within ±500 Hertz.

In an embodiment, the frequency error, $f_{rot, i}$, of the rotated data samples may be estimated by performing (1) a coarse frequency selection, (2) a code phase selection, and (3) a fine frequency selection. The coarse frequency selection provides a coarse estimate of the terminal's carrier frequency error so that $f_{Oter}$ is as small as possible, and further removes the initial estimate of the satellite Doppler frequency shift from the data samples. The code phase selection determines the timing of each transmitted signal, as received at the terminal. The timing may thereafter be used to estimate the pseudo-range to the transmitter. And the fine frequency selection estimates the rotator frequency error, $f_{rot,\,i}$. Other processing orders and/or other schemes may also be used to derive the necessary timing and frequency error information, and this is within the scope of the invention.

For a code phase search, the received signal is processed to determine the timing for each transmitted signal used to estimate the terminal's position and velocity. The baseband frequency error, $f_{bb,\,i}$, is a non-pure tone since the transmitted signal includes data that may be spread with a spreading code. This spreading code is typically a pseudo-random noise (PN) sequence, such as the Gold PN code used for GPS satellites. A transmitted signal's timing may be determined at the terminal by correlating the rotated data samples with the same spreading sequence used at the transmitter.

In particular, the rotated data samples are correlated with a locally generated PN sequence at various offsets (or phases), with each PN phase corresponding to a hypothesis for the transmitted signal's timing For each hypothesis, short segments of data samples (i.e., short with respect to the baseband frequency error) may be correlated with the PN sequence for the hypothesis, and the correlation results for multiple segments may be (non-coherently) accumulated to provide a correlation result for the hypothesis. By removing the satellite Doppler frequency shift, the frequency error in the rotated data samples is reduced and a longer integration time (i.e., longer segments) may be used for the coherent integration to improve signal detection. The higher energy from the correlations also facilitates demodulation to extract data from the baseband signal.

For the fine frequency search phase, the hypotheses are tested for correlation using coherent integration and non-coherent integration to determine the amount of energy in at various frequency offsets. The coherent integration may be performed based on a fast Fourier transform (FFT), or some other suitable rotate and accumulate correlation technique. In particular, the rotated data samples may be correlated with a locally generated sequence that is encoded with a PN code associated with the particular transmitted signal to be recovered. The correlation may be performed for $N_{FFT}$ segments to provide a vector of $N_{FFT}$ correlation values. An $N_{FFT}$ point FFT is then performed on the vector of correlation values. The output from the FFT indicates how strongly the data sample correlate with the locally generated sequence. In addition, the particular frequency bin at which the peak correlation value occurs indicates the offset in frequency of the locally generated sequence from the signal received from the satellite being processed (i.e., the satellite associated with the PN code with which the locally generated sequence was encoded). The frequency bin with the highest energy yields the best frequency and code phase hypothesis (i.e., this frequency bin is the best estimate of the frequency error, $f_{rot,\,i}$, in the rotated data samples).

The frequency search phase provides an estimate of the frequency error in the rotated data samples, $f_{rot,\,i}$, which may be expressed as:

$$\hat{f}_{rot,\,i} = \Delta f_{Vsat,\,i} + \hat{f}_{Vter,\,i} + \Delta f_{Osat,\,i} - f_{Oter}. \qquad \text{Eq (5)}$$

The baseband frequency error may then be estimated by adding back (1) the initial estimate of the satellite Doppler frequency shift, $\tilde{f}_{Vsat,\,i}$, (which may have been determined at the base station's position) and (2) the estimated satellite carrier frequency offset, $\hat{f}_{Osat,\,i}$, with the estimated frequency error in the rotated data samples, $\hat{f}_{rot,\,i}$. This may be expressed as:

$$\begin{aligned}\hat{f}_{bb,i} &= \hat{f}_{rot,i} + (\tilde{f}_{Vsat,i} + \hat{f}_{Osat,i}) \\ &= \Delta f_{Vsat,i} + \hat{f}_{Vter,i} + \Delta f_{Osat,i} - f_{Oter} + \tilde{f}_{Vsat,i} + \hat{f}_{Osat,i} \\ &= f_{Vsat,i} + \hat{f}_{Vter,i} + f_{Osat,i} - f_{Oter},\end{aligned} \qquad \text{Eq (6)}$$

where $\hat{f}_{bb,\,i}$ is the estimated baseband frequency error. In equation (6), $\hat{f}_{bb,\,i}$ may be estimated by the terminal, $f_{Vsat,\,i}$ may be subsequently and more accurately estimated for the terminal's position (once determined), $\hat{f}_{Vter,\,i}$ is an unknown related to the terminal's velocity, $f_{Osat,\,i}$ may be estimated and accounted for, and $f_{Oter}$ may also be an unknown to be solved for.

As shown above, the baseband frequency error may be estimated without use of a frequency control or tracking loop. In this case, the baseband frequency error may be estimated by correlating over a number of PN phase hypotheses and a number of frequency bins. The size of the frequency bin is linked to the coherent integration period. Longer coherent integration periods require smaller frequency bin sizes in order to reduce the integration losses, and therefore result in higher accuracy.

If the terminal's oscillator is slaved or locked to the carrier frequency of the base station and if the frequency base of the communication system is either (1) accurate (derived from the GPS system or from a very accurate clock) (2) stable but off by some known amount (measured against an accurate source)), then the unknown part of the terminal's oscillator frequency offset, $f_{Oter}$, corresponds to the Doppler frequency shift due to the motion of the terminal relative to the base station.

The velocity of the terminal, $\bar{v}_T$, may be estimated based on the estimated baseband frequency error, $\hat{f}_{bb,\,i}$, as follows. Initially, a pseudo-range measurement to each transmitter (i.e., each satellite and/or each base station) to be used to estimate the terminal's velocity and position may be determined based on the arrival time of the signal transmitted by the transmitter (e.g., as identified by the PN offset from the code phase search). The position of the terminal may then be estimated using the pseudo-range measurements to the transmitters and their locations. The position determination may be performed using various techniques known in the art.

A residual rate of change of pseudo-range may then be derived based on the estimated baseband frequency error shown in equation (6). To estimate this baseband frequency error, the Doppler frequency shift due to the motion of each transmitter (e.g., each satellite) may be initially estimated (e.g., at the base station position) and provided to the terminal (or the PDE or some other entity). The baseband frequency error may then be estimated in the manner described above for each transmitter (e.g., each satellite) to be used for position and velocity estimation. For the embodiment described above, the baseband frequency error may be estimated by determining the frequency error of the rotated data samples and adding back the initial estimate of the transmitter's Doppler frequency shift. For each transmitter, the baseband frequency error estimate, $\hat{f}_{bb,\,i}$, may be expressed as shown in equation (6), which is:

$$\hat{f}_{bb,\,i} = f_{Vsat,\,i} + \hat{f}_{Vter,\,i} + f_{Osat,\,i} - f_{Oter}, \qquad \text{Eq (7)}$$

where i is an index for the transmitters (i.e., i=1, 2, . . . ).

The velocity of the terminal, $\bar{v}_T$ (e.g., in the x, y and z planes) and the terminal carrier frequency error, fOter, are the unknowns to solve for. To solve for these unknowns, the baseband frequency error estimate, $\hat{f}_{bb,\,i}$, for each transmitter may be converted to velocity (in meters per second) by multiplying by the wavelength, $\lambda$, for the nominal carrier frequency, fnom (or the terminal or satellite oscillator frequency). Assuming that the satellite positions are known and the terminal position is determined as noted above, then the unknowns may be expressed as:

$$\hat{f}_{bb,\,i}\cdot\lambda = \hat{f}_{Vsat,\,i}\cdot\lambda - \bar{v}_T\cdot\bar{1}_{Si} + \hat{f}_{Osat,\,i}\cdot\lambda - f_{Oter}\cdot\lambda, \qquad \text{Eq (8)}$$

where $\hat{f}_{Vsat,\,i}$ is a revised (and typically more accurate) estimate of the satellite Doppler frequency shift (e.g., as determined at the terminal's position), $\bar{v}_T$ is the velocity vector of the terminal (the unknowns to be solved for), and $\bar{1}_{Si}$ is a unit vector from the terminal to the satellite (determined from the known coordinates of the satellites and terminal).

From equations (7) and (8), the terminal's velocity may be expressed as:

$$\hat{f}_{Vter,\,i}\cdot\lambda = -\bar{v}_T\cdot\bar{1}_{Si}. \qquad \text{Eq (9)}$$

The residual rate of change of pseudo-range for the i-th satellite (after the effect of the satellite's motion and carrier frequency offset have been estimated and removed) may be expressed as:

$$\dot{\rho}_{Si} = -(\hat{f}_{bb,\,i} - \hat{f}_{Vsat,\,i} - \hat{f}_{Osat,\,i})\cdot\lambda\bar{v}_T\cdot\bar{1}_{Si} + f_{Oter}\cdot\lambda \qquad \text{Eq (10)}$$

The residual rate of change of pseudo-range, $\dot{\rho}_{Si}$, may be determined for each satellite based on (1) the estimated baseband frequency error, $\hat{f}_{bb,\,i}$, (2) the revised estimate of the satellite Doppler frequency shift, $\hat{f}_{Vsat\,i}$, (3) the estimate of the satellite carrier frequency offset, $\hat{f}_{Osat,\,i}$, and (4) the wavelength of the oscillator frequency, A. Equations (8) and (10) also show that the residual rates of change of pseudo-ranges for the satellites are due to the terminal Doppler frequency shift, $f_{Vter,\,i}$, and the terminal carrier frequency error, $f_{Oter}$.

Equation (10) may be used to estimate the terminal's velocity, $\bar{v}_T$, for various scenarios. For example, equation (10) may be used when signals from both satellites and base stations are used for position and velocity estimation, or when only signals from satellites are used for position and velocity estimation Also, equation (10) may be applied to any coordinate frames and dimensionality. Some of these scenarios are described in further detail below.

3D Velocity Estimation for a Terminal with Satellites and a Single Base Station If the carrier frequency of a signal transmitted from the serving base station is equal to a nominal carrier frequency (or that any offset in the carrier frequency is known and can be adjusted or accounted for), then any oscillator frequency error, $f_{Oter}$, at the terminal would be due to movement of the terminal relative to the serving base station. In this case, the terminal carrier frequency error would not need to be handled as an independent unknown, but would be a function of the terminal velocity. Hence, one of the unknowns in the velocity estimation may be eliminated and the number of required measurements is reduced by one. However, because of the proximity to the base station, it would be necessary to accurately know the terminal position before performing the velocity computation.

To estimate a 3-dimensional (3D) velocity of the terminal based on signals transmitted from the satellites and a single base station, the following notations are used:

$\bar{x}=(x\ y\ z)$ is the terminal's coordinates in an ECEF (earth centered, earth fixed) frame;

$\bar{x}_{Si}=(x_{Si}\ y_{Si}\ z_{Si})$ is the coordinates of the i-th satellite in the ECEF frame;

$\bar{x}_B=(x_B\ y_B\ z_B)$ is the coordinates of the base station in the ECEF frame;

$\bar{v}_T=(\dot{x}\ \dot{y}\ \dot{z})$ is the terminal's velocity vector in the ECEF frame, where $\dot{x}$, $\dot{y}$, and $\dot{z}$ are the terminal's velocity in the x, y, and z planes, respectively;

$$\bar{1}_{Si} = \frac{\bar{x} - \bar{x}_{Si}}{|\bar{x} - \bar{x}_{Si}|}$$

is a unit vector directed from the i-th satellite position to the terminal position expressed in the ECEF frame;

$$\bar{1}_B = \frac{\bar{x} - \bar{x}_B}{|\bar{x} - \bar{x}_B|}$$

is a unit vector directed from the terminal position to the base station position expressed in the ECEF frame; and $\dot{\rho}_{Si}$ is the residual rate of change of pseudo-range for the i-th satellite (after the effects of the satellite's motion has been estimated and removed).

Since there are three unknowns (i.e., $\dot{x}$, $\dot{y}$, and $\dot{z}$), three or more satellites need to be used to estimate the terminal's velocity. Initially, each satellite's residual rate of change of pseudo-range (after the effects of the satellite's motion and carrier frequency offset have been estimated and eliminated) may be expressed as:

$$\dot{\eta}_{Si} = \bar{v}_T\cdot\bar{1}_{Si} - \bar{v}_T\cdot\bar{1}_B = \bar{v}_T(\bar{1}_{Si} - \bar{1}_B). \qquad \text{Eq (11)}$$

The satellite's residual rate of change of pseudo-range, $\dot{\rho}_{Si}$, may be estimated based on the estimated baseband frequency error, $\hat{f}_{bb,\,i}$, the estimated satellite Doppler frequency shift, $\hat{f}_{Vsat,\,i}$, and the estimated satellite carrier frequency offset, $\hat{f}_{Osat,\,i}$, as shown in equation (10). Since the frequency error estimates, $\hat{f}_{bb,\,i}$ and $\hat{f}_{Vsat,\,i}$, are subject to errors due to noise, the residual rate of change of pseudo-range, $\dot{\rho}_{Si}$, is correspondingly subject to errors due to noise.

The measurements from all satellites may be used to form a set of equations, which may be expressed as:

$$\begin{bmatrix} \dot{\rho}_{S1} \\ \dot{\rho}_{S2} \\ \vdots \\ \dot{\rho}_{Sn} \end{bmatrix} = \begin{bmatrix} \frac{x-x_{S1}}{|\bar{x}-\bar{x}_{S1}|} - \frac{x-x_B}{|\bar{x}-\bar{x}_B|} & \frac{y-y_{S1}}{|\bar{x}-\bar{x}_{S1}|} - \frac{y-y_B}{|\bar{x}-\bar{x}_B|} & \frac{z-z_{S1}}{|\bar{x}-\bar{x}_{S1}|} - \frac{z-z_B}{|\bar{x}-\bar{x}_B|} \\ \frac{x-x_{S2}}{|\bar{x}-\bar{x}_{S2}|} - \frac{x-x_B}{|\bar{x}-\bar{x}_B|} & \frac{y-y_{S2}}{|\bar{x}-\bar{x}_{S2}|} - \frac{y-y_B}{|\bar{x}-\bar{x}_B|} & \frac{z-z_{S2}}{|\bar{x}-\bar{x}_{S2}|} - \frac{z-z_B}{|\bar{x}-\bar{x}_B|} \\ \vdots & \vdots & \vdots \\ \frac{x-x_{Sn}}{|\bar{x}-\bar{x}_{Sn}|} - \frac{x-x_B}{|\bar{x}-\bar{x}_B|} & \frac{y-y_{Sn}}{|\bar{x}-\bar{x}_{Sn}|} - \frac{y-y_B}{|\bar{x}-\bar{x}_B|} & \frac{z-z_{Sn}}{|\bar{x}-\bar{x}_{Sn}|} - \frac{z-z_B}{|\bar{x}-\bar{x}_B|} \end{bmatrix} \begin{bmatrix} \dot{x} \\ \dot{y} \\ \dot{z} \end{bmatrix} = A \begin{bmatrix} \dot{x} \\ \dot{y} \\ \dot{z} \end{bmatrix} \quad \text{Eq (12)}$$

For simplicity, the following notations are defined:

$\bar{M} = [\dot{\rho}_{Si}\ \dot{\rho}_{Si}\ \ldots\ \dot{\rho}_{Si}]^T$ is a vector of residual rates of change of pseudo-ranges for the satellites, where "$T$" denotes the transpose; and $\bar{u} = [\dot{x}\ \dot{y}\ \dot{z}]^T$ is a vector of unknowns to be solved, which in this case is the terminal's velocity vector.

Equation (10) may then be expressed as:

$$\bar{M} = A\bar{u} + \bar{N}, \quad \text{Eq (13)}$$

where $\bar{N}$ is the noise vector.

The minimum variance linear estimator of the vector $\bar{u}$ may be expressed as:

$$\bar{u} = (A^T R_N^{-1} A)^{-1} A^T R_N^{-1} \bar{M}, \quad \text{Eq (14)}$$

where $R_N$ is the covariance matrix of the noise measurements. The covariance matrix $R_N$ is typically estimated based on the particular design of the receiver unit and the system (e.g., the signal bandwidth, the received signal power, and so on), as is known in the art and not described herein.

The covariance matrix, $R_T$, of the estimate of $\bar{u}$ may be expressed as:

$$R_T = (A^T R_N^{-1} A)^{-1}. \quad \text{Eq (15)}$$

The covariance matrix, $R_T$, provides an indication of the confidence in (or the quality of) the estimate of $\bar{u}$. Thus, the covariance matrix, $R_T$, may be compared against a particular threshold and the result of the comparison may be used for various purposes (e.g., to decide whether to use or discard the estimate of $\bar{u}$).

2D Velocity Estimation for a Terminal with Satellites and a Single Base Station In most cases, the vertical velocity is of little interest. Therefore, if the computations are performed in an ENU (East North Up) frame associated with the base-station (essentially the same axis orientation as the ENU frame at the terminal location for small terminal-base station distances) it is possible to reduce the number of unknowns by not attempting to estimate the "Up" component. The following notations are used:

$\bar{x}'_{3D} = (x'\ y'\ z')$ is the terminal's threedimensional coordinate vector in the ENU frame;

$\bar{x}'_{3D} = (x'_{Si}\ y'_{Si}\ z'_{Si})$ is the i-th satellite's three-dimensional coordinate vector in the ENU frame;

$\bar{x}' = (x'\ y')$ is the vector of the terminal's 2D coordinates in the ENU frame associated with a serving base station;

$\bar{x}'_{Si} = (x'_{Si}\ y'_{Si})$ is the vector of 2D coordinates of the i-th satellite in the ENU frame;

$\bar{v}'_T = (\dot{x}'\ \dot{y}')$ is the terminal's velocity vector in the EN (east north) plane (assumed to be in the horizontal plane);

$$\bar{1}'_{Si} = \frac{\bar{x}' - \bar{x}'_{Si}}{|\bar{x}' - \bar{x}'_{Si}|}$$

is a unit vector directed from the i-th satellite position to the terminal position expressed in the ENU frame;

$$\bar{1}'_B = \frac{\bar{x}' - \bar{x}'_B}{|\bar{x}' - \bar{x}'_B|}$$

is a unit vector directed from the terminal position to the base station position expressed in the ENU frame;

$$\cos\vartheta = \frac{|\bar{x}' - \bar{x}'_{Si}|}{|\bar{x}'_{3D} - \bar{x}'_{Si3D}|}$$

is the cosine of the angle between the vector going from the terminal to the satellite and the east north plane; and $\dot{\rho}'_{Si}$ is the component of the residual rate of change of pseudo-range for the i-th satellite (after the effect of the satellite's motion and carrier frequency offset has been estimated and removed) in the east-north plane.

Due to curvature of the earth, the ENU frame associated with the serving base station is nearly identical with the ENU frame associated with the terminal (if the terminal is assumed to be within 10 km of the serving base station).

Since there are two unknowns (i.e., $\dot{x}'$ and $\dot{y}'$), two or more satellites may be used to estimate the terminal's velocity. Each satellite's residual rate of change of pseudo-range may be determined as:

$$\dot{\rho}'_{Si} = -(\hat{f}_{bb, i} - \hat{f}_{Vsat, i} - \hat{f}_{Osat, i}) \cdot \lambda \cdot \cos(\vartheta) \quad \text{Eq (16a)}$$

This residual rate of change of pseudo-range may be expressed as a function of the terminal velocity and the satellite and serving base-station locations as follows:

$$\dot{\rho}'_{Si} = \bar{v}'_T \cdot \bar{1}'_{Si} - \bar{v}'_T \cdot \bar{1}'_B = \bar{v}'_T (\bar{1}'_{Si} - \bar{1}'_B) \quad \text{Eq (16b)}$$

The measurements from all satellites may be used to form a set of equations, which may be express as:

$$\begin{bmatrix} \dot{\rho}'_{S1} \\ \dot{\rho}'_{S2} \\ \vdots \\ \dot{\rho}'_{Sn} \end{bmatrix} = \begin{bmatrix} \frac{x'-x'_{S1}}{|\bar{x}'-\bar{x}'_{S1}|} - \frac{x'-x'_B}{|\bar{x}'-\bar{x}'_B|} & \frac{y'-y'_{S1}}{|\bar{x}'-\bar{x}'_{S1}|} - \frac{y'-y'_B}{|\bar{x}'-\bar{x}'_B|} \\ \frac{x'-x'_{S2}}{|\bar{x}'-\bar{x}'_{S2}|} - \frac{x'-x'_B}{|\bar{x}'-\bar{x}'_B|} & \frac{y'-y'_{S2}}{|\bar{x}'-\bar{x}'_{S2}|} - \frac{y'-y'_B}{|\bar{x}'-\bar{x}'_B|} \\ \vdots & \vdots \\ \frac{x'-x'_{Sn}}{|\bar{x}'-\bar{x}'_{Sn}|} - \frac{x'-x'_B}{|\bar{x}'-\bar{x}'_B|} & \frac{y'-y'_{Sn}}{|\bar{x}'-\bar{x}'_{Sn}|} - \frac{y'-y'_B}{|\bar{x}'-\bar{x}'_B|} \end{bmatrix} \begin{bmatrix} \dot{x}' \\ \dot{y}' \end{bmatrix} = A' \begin{bmatrix} \dot{x}' \\ \dot{y}' \end{bmatrix}. \quad \text{Eq (17)}$$

Using the notations $\overline{M}'=[\dot{\rho}'_{Si}\ \dot{\rho}'_{Si}\ \ldots\ \dot{\rho}'_{Si}]^T$ and $\overline{u}'=[\dot{x}'\ \dot{y}']^T$, equation (17) may be expressed as:

$$\overline{M}' = A'\overline{u}' + \overline{N}. \quad \text{Eq (18)}$$

The minimum variance linear estimate of the vector $\overline{u}'$ may be expressed as:

$$\overline{u}' = (A'^T R_N^{-1} A')^{-1} A'^T R_N^{-1} \overline{M}'. \quad \text{Eq (19)}$$

The covariance matrix, $R'_T$, of the estimate of $\overline{u}'$ may be expressed as:

$$R'_T = (A'^T R_N^{-1} A')^{-1}. \quad \text{Eq (20)}$$

3D Velocity Estimation for a Terminal with Satellites and Multiple Base Station If the terminal is in communication with multiple base stations (e.g., in soft handoff), then the terminal oscillator frequency is a weighted average of the carrier frequencies of the signals from these base stations. If the weighting coefficients are known at the terminal, then the carrier frequencies of the base stations may be determined and accounted for, and any oscillator frequency error, $f_{Oter}$, at the terminal would be due to movement of the terminal relative to these base stations.

The frequency of the signal received from the i-th satellite may be expressed $f_{Rsat,\ i} = f_{nom} + f_{Osat,\ i} + f_{Vsat,\ i} + f_{Vter,\ i}$ as shown above in equation (2). Similarly, the frequency of the signal received from the j-th base station may be expressed as being equal to the nominal carrier frequency, $f_{nom}$, plus (1) that base station's carrier frequency offset, $f_{Obs,\ j}$, relative to the nominal frequency and (2) a Doppler shift in the base station carrier frequency, $f_{Vbs,\ j}$, due to motion of the terminal relative to the base station (i.e., $f_{Rbs,\ j} = f_{nom} + f_{Obs,\ j} + f_{Vbs,\ j}$). If the relationships between the carrier frequencies of the satellites, the base stations, and the terminal are known, then the satellite carrier frequency offset, $f_{Osat,\ i}$, and the base station carrier frequency offset, $f_{Obs,\ j}$, are also known and may be accounted for. For simplicity, the base station carrier frequency offset, $f_{Obs,\ j}$, is assumed to be zero for the following derivations.

The coefficients $a_{Bj}$ are used for combining the carrier frequencies of the base stations in order to derive the terminal's LO frequency. These coefficients are defined such that the following applies:

$$\sum_{j=1}^{N_B} \alpha_{Bj} = 1. \quad \text{Eq (21)}$$

The terminal's oscillator frequency, $f_{Cter}$, may then be expressed as:

$$f_{Cter} = \sum_{j=1}^{N_B} \alpha_{Bj} \cdot f_{Rbs,j}, \quad \text{Eq (22)}$$

where $N_B$ is the number of base stations. Multiplying both sides of equation (22) by $\lambda$ and substituting $(f_{nom} + f_{Vbs,j})$ for $f_{Rbs,j}$, the following is derived:

$$f_{Cter} \cdot \lambda = \sum_{j=1}^{N_B} \alpha_{Bj} \cdot (f_{nom} + f_{Vbs,j}) \cdot \lambda = f_{nom} \cdot \lambda + \sum_{j=1}^{N_B} \alpha_{Bj} \cdot f_{Vbs,j} \cdot \lambda. \quad \text{Eq (23)}$$

Since the Doppler shift in the base station carrier frequency, $f_{Vbs,\ j}$, is due to the motion of the terminal relative to the base station, the following may be expressed:

$$f_{Cter} \cdot \lambda = f_{nom} \cdot \lambda - \sum_{j=1}^{N_B} \alpha_{Bj} \cdot (\overline{v}_T \cdot \overline{1}_{Bj}). \quad \text{Eq (24)}$$

After downconversion by the LO signal at the terminal, the baseband frequency error for the i-th satellite (which is the residual frequency offset of the signal received from the satellite) may be expressed as:

$$f_{bb,i} = f_{Csat,i} + f_{Vsat,i} + f_{Vter,i} - f_{Cter} \quad \text{Eq (25)}$$
$$= f_{nom} + f_{Osat,i} + f_{Vsat,i} + f_{Vter,i} - f_{Cter}.$$

Multiplying both sides of equation (25) by $\lambda$ yields the following:

$$f_{bb,i} \cdot \lambda = f_{nom} \cdot \lambda + f_{Osat,i} \cdot \lambda + f_{Vsat,i} \cdot \lambda + f_{Vter,i} \cdot \lambda - f_{Oter} \cdot \lambda. \quad \text{Eq (26)}$$

Based on equations (24) and (26), the following may be expressed:

$$f_{bb,i} \cdot \lambda = f_{nom} \cdot \lambda + f_{Osat,i} \cdot \lambda + f_{Vsat,i} \cdot \lambda + f_{Vter,i} \cdot \lambda - \quad \text{Eq (27)}$$
$$\left[ f_{nom} \cdot \lambda - \sum_{j=1}^{N_B} \alpha_{Bj} \cdot (\overline{v}_T \cdot \overline{1}_{Bj}) \right]$$
$$= f_{Osat,i} \cdot \lambda + f_{Vsat,i} \cdot \lambda + f_{Vter,i} \cdot \lambda + \sum_{j=1}^{N_B} \alpha_{Bj} \cdot (\overline{v}_T \cdot \overline{1}_{Bj})$$
$$= f_{Osat,i} \cdot \lambda + (\overline{v}_{Si} - \overline{v}_T) \cdot \overline{1}_{Si} + \sum_{j=1}^{N_B} \alpha_{Bj} \cdot (\overline{v}_T \cdot \overline{1}_{Bj}).$$

Equation (27) may then be rearranged as follows:

$$f_{bb,i} \cdot \lambda - f_{Osat,i} \cdot \lambda - \overline{v}_{Si} \cdot \overline{1}_{Si} = \left[ \sum_{j=1}^{N_B} \alpha_{Bj} \cdot (\overline{v}_T \cdot \overline{1}_{Bj}) \right] - \overline{v}_{Si} \cdot \overline{1}_{Si}. \quad \text{Eq (28)}$$

Each satellite's residual rate of change of pseudo-range may be estimated based on the measured baseband frequency offset, $\hat{f}_{bb,\ i}$, the computed frequency offset due to the satellite movement, $\hat{f}_{Vsat,\ i}$, and the computed satellite oscillator offset, $\hat{f}_{Osat,\ i}$, as follows:

$$\dot{\hat{\rho}} = -(\hat{f}_{bb,\ i} - \hat{f}_{Vsat,\ i} - \hat{f}_{Osat,\ i}) \cdot \lambda.$$

Based on equation (28), it can be seen that this rate of change of pseudo-range is only a function of the terminal velocity, as expressed below:

$$\dot{\hat{\rho}}_{Si} = \overline{v}_T \cdot \overline{1}_{Si} - \sum_{j=1}^{N_B} \alpha_{Bj} \cdot (\overline{v}_T \cdot \overline{1}_{Bj}) \quad \text{Eq (29)}$$

To estimate the 3-dimensional velocity of the terminal based on signals transmitted from the satellites and multiple base stations, the notations of $\overline{x}=(x\ y\ z)$ for the terminal's coordinates, $\overline{x}_{Si}=(x_{Si}\ y_{Si}\ z_{Si})$ for the i-th satellite's coordinates, $\overline{v}_T=(\dot{x}\ \dot{y}\ \dot{z})$ for the terminal's velocity, $$\overline{1}_{Si} = \frac{\overline{x} - \overline{x}_{Si}}{|\overline{x} - \overline{x}_{Si}|}$$

for the unit vector from the i-th satellite to the terminal, $$\overline{1}_{Bj} = \frac{\overline{x} - \overline{x}_{Bj}}{|\overline{x} - \overline{x}_{Bj}|}$$

for the unit vector from the terminal to the j-th base station, and $\dot{\rho}_{Si}$ for the i-th satellite's residual rate of change of pseudo-range (all defined above for the ECEF frame in the 3D satellite plus base station case) are used.

The measurements from all satellites and base stations may be used to form a set of equations, which may be expressed as:

$$\begin{bmatrix} \dot{\rho}_{S1} \\ \dot{\rho}_{S2} \\ \vdots \\ \dot{\rho}_{Sn} \end{bmatrix} = \begin{bmatrix} \frac{x-x_{S1}}{|\overline{x}-\overline{x}_{S1}|} - \sum_{j=1}^{N_B} \alpha_{Bj} \frac{x-x_{Bj}}{|\overline{x}-\overline{x}_{Bj}|} & \frac{y-y_{S1}}{|\overline{x}-\overline{x}_{S1}|} - \sum_{j=1}^{N_B} \alpha_{Bj} \frac{y-y_{Bj}}{|\overline{x}-\overline{x}_{Bj}|} & \frac{z-z_{S1}}{|\overline{x}-\overline{x}_{S1}|} - \sum_{j=1}^{N_B} \alpha_{Bj} \frac{z-z_{Bj}}{|\overline{x}-\overline{x}_{Bj}|} \\ \frac{x-x_{S2}}{|\overline{x}-\overline{x}_{S2}|} - \sum_{j=1}^{N_B} \alpha_{Bj} \frac{x-x_{Bj}}{|\overline{x}-\overline{x}_{Bj}|} & \frac{y-y_{S2}}{|\overline{x}-\overline{x}_{S2}|} - \sum_{j=1}^{N_B} \alpha_{Bj} \frac{y-y_{Bj}}{|\overline{x}-\overline{x}_{Bj}|} & \frac{z-z_{S2}}{|\overline{x}-\overline{x}_{S2}|} - \sum_{j=1}^{N_B} \alpha_{Bj} \frac{z-z_{Bj}}{|\overline{x}-\overline{x}_{Bj}|} \\ \vdots & \vdots & \vdots \\ \frac{x-x_{Sn}}{|\overline{x}-\overline{x}_{Sn}|} - \sum_{j=1}^{N_B} \alpha_{Bj} \frac{x-x_{Bj}}{|\overline{x}-\overline{x}_{Bj}|} & \frac{y-y_{Sn}}{|\overline{x}-\overline{x}_{Sn}|} - \sum_{j=1}^{N_B} \alpha_{Bj} \frac{y-y_{Bj}}{|\overline{x}-\overline{x}_{Bj}|} & \frac{z-z_{Sn}}{|\overline{x}-\overline{x}_{Sn}|} - \sum_{j=1}^{N_B} \alpha_{Bj} \frac{z-z_{Bj}}{|\overline{x}-\overline{x}_{Bj}|} \end{bmatrix} \begin{bmatrix} \dot{x} \\ \dot{y} \\ \dot{z} \end{bmatrix} \quad \text{Eq (30)}$$

For simplicity, the following notations are defined $\overline{M}=[\dot{\rho}_{Si}\ \dot{\rho}_{Si}\ \ldots\ \dot{\rho}_{Si}]^T$ and $\overline{u}=[\dot{x}\ \dot{y}\ \dot{z}]^T$. Equation (30) may then be expressed as:

$$\overline{M}=A\overline{u}+\overline{N}.$$

The minimum variance linear estimate of the vector $\overline{u}$ may be expressed as:

$$\overline{u}=(A^T R_N^{-1} A)^{-1} A^T R_N^{-1} \overline{M}.$$

And the covariance matrix, $R_T$, of the estimate of $\overline{u}$ may be expressed as:

$$R_T=(A^T R_N^{-1} A)^{-1}.$$

3D Velocity Estimation for a Terminal with Satellites Only

To estimate the 3-dimensional velocity of the terminal based only on signals transmitted from the satellites, the notations of $\overline{x}=(x\ y\ z)$ for the terminal's coordinates, $\overline{x}_{Si}=(x_{Si}\ y_{Si}\ z_{Si})$ for the i-th satellite's coordinates, $\overline{v}_T=(\dot{x}\ \dot{y}\ \dot{z})$ for the terminal's velocity, $$\overline{1}_{Si} = \frac{\overline{x} - \overline{x}_{Si}}{|\overline{x} - \overline{x}_{Si}|}$$

for the unit vector from the i-th satellite to the terminal, and $\dot{\rho}_{Si}$ for the i-th satellite's residual rate of change of pseudo-range (all defined above for the ECEF frame in the 3D satellite plus base station case) are used. Moreover, the terminal carrier frequency error, $f_{Oter}$, is an unknown for this case since a deterministic relationship between carrier frequency error and terminal velocity cannot be established and used to eliminate the carrier frequency error as an unknown. If the relationship between carrier frequency error and terminal velocity is weak, then an additional satellite measurement may be used to account for this additional unknown.

Since there are four unknowns (i.e., $\dot{x}$, $\dot{y}$, $\dot{z}$, and $f_{Oter}$), four or more satellites may be used to estimate the terminal's velocity. Each satellite's residual rate of change of pseudo-range may be determined as shown in equation (10), which is:

$$\dot{\rho}_{Si}=-(\hat{f}_{bb,\ i}-\hat{f}_{Vsat,\ i}-\hat{f}_{Osat,\ i})\cdot\lambda.$$

This residual rate of change of pseudo-range may be expressed as a function of the terminal velocity and the satellite and serving base-station locations as follows:

$$\dot{\rho}_{Si} = \overline{v}_T \cdot \overline{1}_{Si} + f_{Oter} \cdot \lambda \qquad \text{Eq (31)}$$

Again, the satellite's residual rate of change of pseudo-range, $\dot{\rho}_{Si}$, may be estimated based on the estimated base-band frequency error, $\hat{f}_{bb,\ i}$, the estimated satellite Doppler frequency shift, $\hat{f}_{Vsat,\ i}$, and the estimated satellite carrier frequency error, $\hat{f}_{Osat,\ i}$, as shown in equation (10).

The measurements from all satellites may be used to form a set of equations, which may be expressed as:

$$\begin{bmatrix} \dot{\rho}_{S1} \\ \dot{\rho}_{S2} \\ \vdots \\ \dot{\rho}_{Sn} \end{bmatrix} = \begin{bmatrix} \frac{x-x_{S1}}{|\overline{x}-\overline{x}_{S1}|} & \frac{y-y_{S1}}{|\overline{x}-\overline{x}_{S1}|} & \frac{z-z_{S1}}{|\overline{x}-\overline{x}_{S1}|} & +\lambda \\ \frac{x-x_{S2}}{|\overline{x}-\overline{x}_{S2}|} & \frac{y-y_{S2}}{|\overline{x}-\overline{x}_{S2}|} & \frac{z-z_{S2}}{|\overline{x}-\overline{x}_{S2}|} & +\lambda \\ \vdots & \vdots & \vdots & \vdots \\ \frac{x-x_{Sn}}{|\overline{x}-\overline{x}_{Sn}|} & \frac{y-y_{Sn}}{|\overline{x}-\overline{x}_{Sn}|} & \frac{z-z_{Sn}}{|\overline{x}-\overline{x}_{Sn}|} & +\lambda \end{bmatrix} \begin{bmatrix} \dot{x} \\ \dot{y} \\ \dot{z} \\ f_{Oter} \end{bmatrix} = \quad \text{Eq (32)}$$

$$A \begin{bmatrix} \dot{x} \\ \dot{y} \\ \dot{z} \\ f_{Oter} \end{bmatrix}$$

Again, the notations of $\overline{M}=[\dot{\rho}_{Si}\ \ldots\ \dot{\rho}_{Si}]^T$ for the vector of residual rates of change of pseudo-ranges and $\overline{u}=[\dot{x}\ \dot{y}\ \dot{z}\ f_{Oter}]^T$ for the vector of unknowns are used Equation (32) may then be expressed as shown in equation (13), which is:

$$\overline{M}=A\overline{u}+\overline{N}.$$

The minimum variance linear estimate of the vector $\overline{u}$ may be expressed as shown in equation (14), which is:

$$\overline{u}=(A^T R_N^{-1} A)^{-1} A^T R_N^{-1} \overline{M}.$$

The covariance matrix, $R_T$, of the estimate of $\overline{u}$ may be expressed as shown in equation (15), which is:

$$R_T=(A^T R_N^{-1} A)^{-1}.$$

2D Velocity Estimation for a Terminal with Satellites Only

To estimate the 2-dimensional velocity of the terminal based only on signals transmitted from the satellites, the notations of $\bar{x}'=(x'\ y')$ for the terminal's coordinates, $\bar{x}'_{Si}=(x'_{Si}\ y'_{Si})$ for the i-th satellite's coordinates, $\bar{v}'_T=(\dot{x}'\ \dot{y}')$ for the terminal's velocity, $$\bar{1}'_{Si} = \frac{\bar{x}' - \bar{x}'_{Si}}{|\bar{x}' - \bar{x}'_{Si}|}$$

for the unit vector from the i-th satellite to the terminal, and $\dot{\rho}'_{Si}$ for the i-th satellite's residual rate of change of pseudo-range (all defined above for the ENU frame in the 2D satellite plus base station case) are used. Moreover, the terminal carrier frequency error, $f_{Oter}$, is an unknown for this case.

Since there are three unknowns (i.e., $\dot{x}'$, $\dot{y}'$, and $f_{Oter}$), three or more satellites may be used to estimate the terminal's velocity. Each satellite's residual rate of change of pseudo-range may be determined as:

$$\dot{\rho}_{Si}=-(\hat{f}_{bb,\ i}-\hat{f}_{Vsat,\ i}-\hat{f}_{Osat,\ i})\cdot\lambda\cdot\cos(\vartheta).$$

This residual rate of change of pseudo-range may be expressed as a function of the terminal velocity and the satellite locations as follows:

$$\dot{\rho}_{Si}=\bar{v}'_T\bar{1}_{Si}+f_{Oter}\cdot\lambda.$$

The measurements from all satellites may be used to form a set of equations, which may be express as:

$$\begin{bmatrix}\dot{\rho}'_{S1}\\ \dot{\rho}'_{S2}\\ \vdots \\ \dot{\rho}'_{Sn}\end{bmatrix} = \begin{bmatrix}\frac{x'-x'_{S1}}{|\bar{x}'-\bar{x}'_{S1}|} & \frac{y'-y'_{S1}}{|\bar{x}'-\bar{x}'_{S1}|} & +\lambda \\ \frac{x'-x'_{S2}}{|\bar{x}'-\bar{x}'_{S2}|} & \frac{y'-y'_{S2}}{|\bar{x}'-\bar{x}'_{S2}|} & +\lambda \\ \vdots & \vdots & \vdots \\ \frac{x'-x'_{Sn}}{|\bar{x}'-\bar{x}'_{Sn}|} & \frac{y'-y'_{Sn}}{|\bar{x}'-\bar{x}'_{Sn}|} & +\lambda\end{bmatrix}\begin{bmatrix}\dot{x}'\\ \dot{y}'\\ f_{Oter}\end{bmatrix} = A'\begin{bmatrix}\dot{x}'\\ \dot{y}'\\ f_{Oter}\end{bmatrix}\quad\text{Eq (33)}$$

Using the notations $\bar{M}'=[\dot{\rho}'_{Si}\ \dot{\rho}'_{Si}]^T$ and $\bar{u}'=[\dot{x}'\ \dot{y}']^T$, equation (33) may then be expressed as shown in equation (18), which is:

$$\bar{M}=A'\bar{u}'+\bar{N}.$$

The minimum variance linear estimate of the vector $\bar{u}'$ may be expressed as shown in equation (19), which is:

$$\bar{M}'=(A'^T R_N^{-1} A')^{-1} A'^T R_N^{-1} \bar{M}'.$$

The covariance matrix, $R'_T$, of the estimate of $\bar{u}'$ may be expressed as shown in equation (20), which is:

$$R'_T=(A'^T R_N^{-1} A')^{-1}.$$

Figure 3:
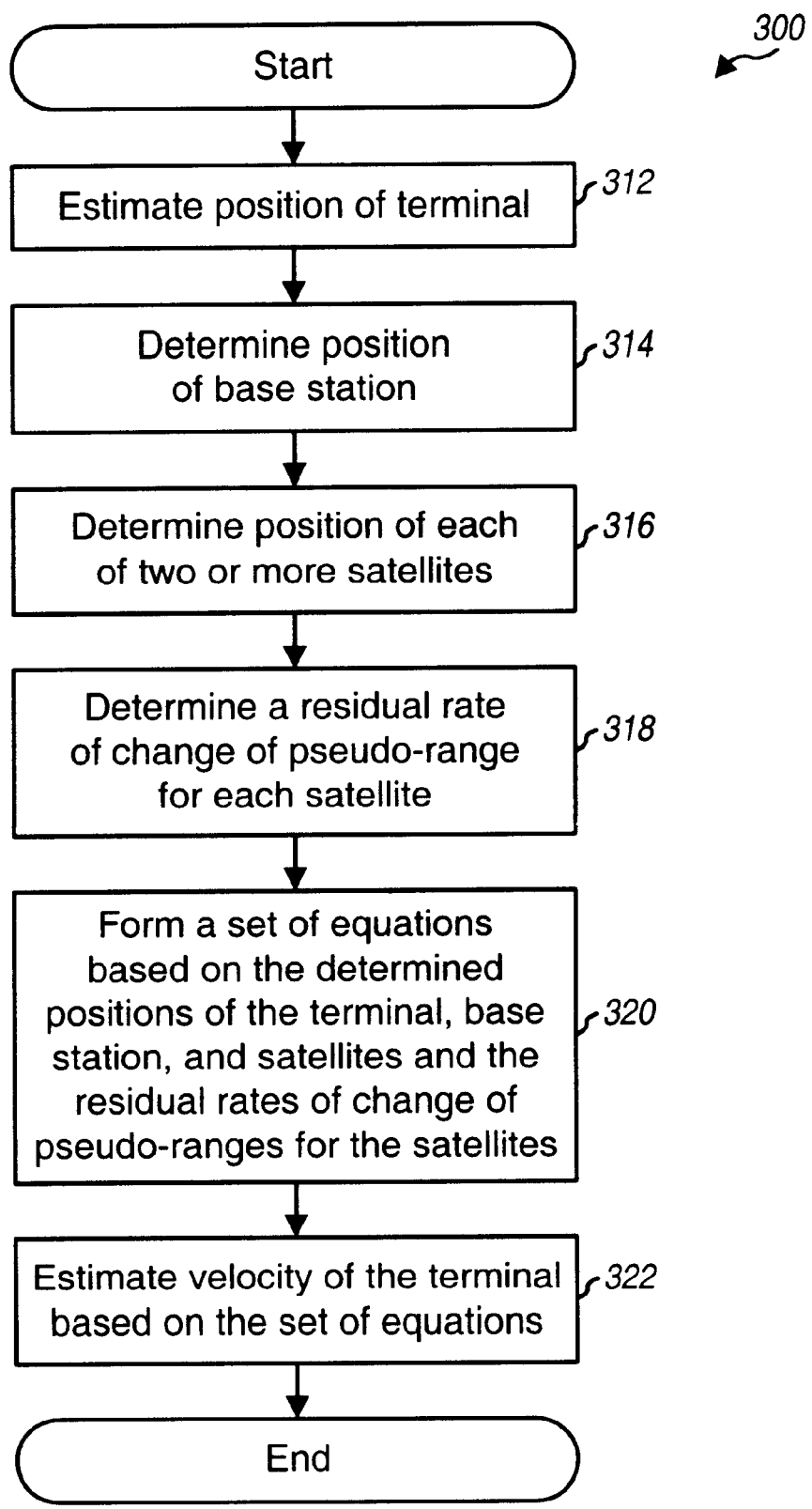
FIG. 3 is a flow diagram of an embodiment of a process for estimating the velocity of the terminal based on signals from satellites and a base station.

FIG. 3 is a flow diagram of an embodiment of a process 300 for estimating the velocity of the terminal based on signals from the satellites and base station. Initially, the position of the terminal is estimated, at step 312. The terminal's position may be estimated based on pseudo-range measurements derived from the arrival times of the signals transmitted from the satellites and/or base stations, as is known in the art. The position of a base station (e.g., the serving base station) is determined at step 314, and the position of each of two or more satellites is determined at step 316. The positions of the satellites and base station may be determined, e.g., by the base station and reported to the entity performing the velocity estimation for the terminal. A residual rate of change of pseudo-range, $\dot{\rho}_{Si}$, is then determined for each satellite to be used to estimate the terminal's velocity, at step 318. The residual rate of change of pseudo-range may be estimated based on the baseband frequency error, $\hat{f}_{bb,\ i}$, estimated for each satellite (e.g., by the terminal) and the satellite Doppler frequency shift, $\hat{f}_{Vsat,\ i}$, estimated for each satellite at the terminal position, as described above in equation (10). Other techniques to estimate the residual rate of change of pseudo-range may also be used and are within the scope of the invention.

A set of equations is then formed based on the determined positions of the terminal, the base station, and the two or more satellites and the determined residual rates of change of pseudo-ranges for the satellites. This set of equations may be as shown in equation (12) for a 3-dimensional (e.g., ECEF) frame or equation (17) for a 2-dimensional (e.g., east north) frame. The velocity of the terminal is then estimated based on the set of equations, as shown in equation (14) for the 3-D frame or equation (19) for the 2-D frame.

The flow diagram shown in FIG. 3 may be modified for the embodiments described above wherein the terminal's velocity is estimated based only on signals transmitted from the satellites (and not from the base stations). For these embodiments, the base station's position is not needed and step 314 may be eliminated. Moreover, the residual rates of change of pseudo-ranges are determined for three or more satellites, in step 318, and the set of equations further include an known for the terminal carrier frequency offset, $f_{Oter}$, as shown in equations (30) and (32).

The computations to estimate the terminal's velocity may be performed at the terminal, the base station, or some other entity capable of forming and solving the proper set of equations, as described above. The entity performing the velocity estimation is provided with the required information, which may include (1) the position of the terminal, (possibly) the base station, and the satellites, (2) the estimated baseband frequency errors for the satellites, and (3) the estimated Doppler frequency shifts for the satellites, or some equivalent information.

The velocity estimation techniques described herein may be implemented by various means. For example, these techniques may be implemented in hardware, software, or a combination thereof For a hardware implementation, the elements used to estimate the terminal's velocity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the velocity estimation techniques may be implemented with modules (e.g., procedures, functions, and so on) that perform the functions described herein. The software codes may be stored in a memory unit (e.g., memory 242 FIG. 2) and executed by a processor (e.g., controller 240). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for estimating a velocity of a terminal in a wireless communication system, comprising:
 determining a position of the terminal;
 determining a position of a base station in communication with the terminal;
 determining a position of each of two or more satellites;
 determining a residual rate of change of pseudo-range for each satellite;
 forming a set of equations based on the determined positions of the terminal, the base station, and the two or more satellites, wherein the set of equations is further formed based on the determined residual rates of change of pseudo-ranges for the two or more satellites; and
 estimating the velocity of the terminal based on the set of equations,
 wherein the residual rate of change of pseudo-range for each satellite is determined as:

$$\dot{\rho}_{Si}=(\hat{f}_{bb,\,i}-\hat{f}_{VSat,\,i})\cdot\lambda,$$

where
 $\dot{\rho}_{Si}$ is the residual rate of change of pseudo-range for an i-th satellite,
 $\hat{f}_{bb,\,i}$ is the estimated baseband signal frequency error for the i-th satellite,
 $\hat{f}_{VSat,\,i}$ is the estimated Doppler frequency shift for the i-th satellite, and
 $\lambda$ is a wavelength associated with the signal from the 1th satellite.

2. The method of claim 1, further comprising:
 downconverting a received signal having included therein a signal transmitted from each of the two or more satellites to provide a baseband signal; and
 estimating a frequency error of the baseband signal for each satellite, and
wherein the residual rate of change of pseudo-range for each satellite is determined based in part on the estimated baseband signal frequency error for the satellite.

3. The method of claim 2, further comprising:
 estimating a Doppler shift in the frequency of the signal transmitted from each satellite, and
 wherein the residual rate of change of pseudo-range for each satellite is further determined based in part on the estimated Doppler frequency shift for the satellite.

4. The method of claim 3, further comprising:
 estimating an offset in a carrier frequency of each satellite, and
 wherein the residual rate of change of pseudo-range for each satellite is further determined based in part on the estimated satellite carrier frequency offset.

5. The method of claim 3, wherein the Doppler frequency shift for each satellite is estimated at the terminal position.

6. The method of claim 1, wherein the velocity of the terminal is estimated for a 3-dimensional frame.

7. The method of claim 6, wherein the 3-dimensional frame is based on an ECEF (earth centered, earth fixed) frame.

8. The method of claim 1, wherein the velocity of the terminal is estimated for a 2-dimensional frame.

9. The method of claim 8, wherein the 2-dimensional frame is based on an ENU (east, north, up) frame.

10. A method for estimating a velocity of a terminal in a wireless communication system, comprising:
 determining a position of the terminal;
 determining a position of a base station in communication with the terminal;
 determining a position of each of two or more satellites;
 determining a residual rate of change of pseudo-range for each satellite, forming a set of equations based on the determined positions of the terminal, the base station, and the two or more satellites, wherein the set of equations is further formed based on the determined residual rates of change of pseudo-ranges for the two or more satellites; and
 estimating the velocity of the terminal based on the set of equations;
 wherein the set of equations comprises:

$$\overline{M}=A\bar{u}+\bar{N},$$

where
 $\overline{M}$ is a vector of the determined residual rates of change of pseudo-ranges for the two or more satellites,
 $A$ is a matrix of elements derived based on the determined positions of the terminal, the base station, and the two or more satellites,
 $\bar{u}$ is a vector for the terminal velocity, and
 $\overline{N}$ is a noise vector.

11. The method of claim 10, wherein the velocity of the terminal is estimated as:

$$\bar{u}=(A^T R_N^{-1} A)^{-1} A^T R_N^{-1} \overline{M},$$

where
 $R_N$ is a covariance matrix of noise measurements.

12. The method of claim 10, wherein the matrix A is defined as:

$$A = \begin{bmatrix} \overline{1}_{S1} - \overline{1}_B \\ \vdots \\ \overline{1}_{SN} - \overline{1}_B \end{bmatrix},$$

where
 $\overline{1}_{Si}$ is a unit vector directed from an i-th satellite position to the terminal position, where i is an index for the two or more satellites, and
 $\overline{1}_B$ is a unit vector directed from the terminal position to the base station position.

13. A method for determining a velocity of a terminal in a wireless communication system, comprising:
 determining an offset of a local oscillator at the terminal, wherein the determining the local oscillator offset includes,
  performing a coherent integration based on a fast Fourier transform (FFT) to provide FFT results, and
  non-coherently integrating the FFT results,
 sorting the non-coherently integrated FFT results into a plurality of frequency bins:
 estimating a first Doppler shift in the frequency of a first signal received at the terminal from a first transmitter;
 estimating a second Doppler shift in the frequency of a second signal received at the terminal from a second transmitter;

estimating a third Doppler shift in the frequency of a third signal received at the terminal from a third transmitter; and determining the velocity of the terminal based on the local oscillator offset and estimates of the first, second, and third Doppler frequency shifts.

14. The method of claim 13, wherein the estimates of the first, second, and third Doppler frequency shifts are provided by a base station in the wireless communication system.

15. The method of claim 13, further comprising:

removing the estimates of the first, second, and third Doppler frequency shifts from the first, second, and third signals, respectively.

16. The method of claim 15, wherein non-coherently integrating includes squaring and accumulating the FFT results.

17. A method for determining a velocity of a terminal in a wireless communication systems comprising:

determining an offset of a local oscillator at the terminal, wherein the determining the local oscillator offset includes,
 performing a coherent integration based on a fast Fourier transform (EFT) to provide FFT results, and
 non-coherently integrating the FFT results, wherein non-coherently integrating the FFT results includes squaring and accumulating the FFT results;

estimating a first Doppler shift in the frequency of a first signal received at the terminal from a first transmitter;

estimating a second Doppler shift in the frequency of a second signal received at the terminal from a second transmitter;

estimating a third Doppler shift in the frequency of a third signal received at the terminal from a third transmitter;

determining the velocity of the terminal based on the local oscillator offset and estimates of the first, second, and third Doppler frequency shifts; and despreading the non-coherently integrated FFT results.

18. The method of claim 17, wherein the despreading includes correlating the FFT results with a pseudo-random noise (PN) sequence at a plurality of PN phases.

19. The method of claim 18, further comprising:

identifying for each transmitter a PN phase associated with a maximum correlated value.

20. The method of claim 19, further comprising:

identifying for each transmitter a frequency offset corresponding to an FFT bin with the maximum correlated value.

21. The method of claim 20, further comprising:

deriving a pseudo-range measurement for each transmitter based on the identified PN phase; and deriving a residual rate of change in pseudo-range based on the identified frequency offset.

22. The method of claim 21, further comprising:

determining a position of the terminal based on pseudo-range measurements for the first, second, and third transmitters.

23. The method of claim 22, wherein the residual rate of change of pseudo-range for each transmitter is determined by multiplying the identified frequency offset for the transmitter by a wavelength for the signal from the transmitter.

24. The method of claim 23, further comprising:

estimating the velocity of the terminal based on an estimated position of the terminal and estimated positions of the transmitters.

* * * * *